United States Patent
Kacludis (10) Patent No.: US 11,970,102 B2
(45) Date of Patent: Apr. 30, 2024

(54) VEHICLE AND METHOD WITH ENERGY RECOVERY LIFT GATE

(71) Applicant: Hiab USA Inc., Perrysburg, OH (US)

(72) Inventor: Alexander S. Kacludis, Streetsboro, OH (US)

(73) Assignee: Hiab USA Inc., Perrysburg, OH (US)

( * ) Notice: Subject to any disclaimer, the term of this patent is extended or adjusted under 35 U.S.C. 154(b) by 2 days.

(21) Appl. No.: 17/587,074

(22) Filed: Jan. 28, 2022

(65) Prior Publication Data

US 2022/0242298 A1     Aug. 4, 2022

Related U.S. Application Data

(60) Provisional application No. 63/143,183, filed on Jan. 29, 2021.

(51) Int. Cl.
  *B60P 1/44*        (2006.01)
  *F15B 1/02*        (2006.01)
  *F15B 21/14*       (2006.01)

(52) U.S. Cl.
  CPC .............. *B60P 1/4471* (2013.01); *F15B 1/022* (2013.01); *F15B 1/024* (2013.01); *F15B 21/14* (2013.01)

(58) Field of Classification Search
  CPC .......... B60P 1/4471; B60P 1/44; F15B 1/022; F15B 1/024; F15B 21/14
  USPC .................................................. 414/545, 557
  See application file for complete search history.

(56) References Cited

U.S. PATENT DOCUMENTS

| | | | |
|---|---|---|---|
| 6,223,530 B1 * | 5/2001 | Weber ................... | B60P 1/4471 60/431 |
| 2001/0036397 A1 * | 11/2001 | Pierrou ................. | B60P 1/4471 414/921 |
| 2009/0094897 A1 * | 4/2009 | Gregg ................... | B60P 1/4471 49/137 |
| 2021/0276636 A1 * | 9/2021 | Griffee ................. | B60P 1/4471 |

FOREIGN PATENT DOCUMENTS

| | | | | |
|---|---|---|---|---|
| AT | 401498 B | * | 8/1996 | ............ B60P 1/4471 |
| DE | 3724226 A1 | * | 2/1989 | ............ B60P 1/4471 |
| DE | 102014110717 B3 | * | 1/2016 | ............ B60P 1/4471 |
| DE | 102014111161 A1 | * | 2/2016 | ............ B60P 1/4471 |
| WO | WO-8803098 A1 | * | 5/1988 | ............ B60P 1/4471 |

* cited by examiner

*Primary Examiner* — James Keenan
(74) *Attorney, Agent, or Firm* — Renner, Otto, Boisselle & Sklar, LLP (57) ABSTRACT

A liftgate assembly, such as a for a delivery vehicle, includes a liftgate that is movable by hydraulic power between a raised position and a lowered position. The hydraulic power unit includes an energy-recovery mechanism that stores energy while the liftgate is being lowered under load. Energy stored by the energy-recovery mechanism, such as in an accumulator, may be used to raise the liftgate. The hydraulic power unit includes a pump that pumps hydraulic fluid for providing hydraulic pressure. The liftgate assembly thereby uses energy more efficiently, enabling repurposing part of the energy from lowering the liftgate (and any cargo thereupon) in raising the liftgate.

18 Claims, 6 Drawing Sheets

VEHICLE AND METHOD WITH ENERGY RECOVERY LIFT GATE

RELATED APPLICATION

This application claims the benefit of U.S. Provisional Application No. 63/143,183, filed Jan. 29, 2021, which is hereby incorporated herein by reference in its entirety.

FIELD OF THE INVENTION

The invention is in the field of liftgates and vehicles with liftgates.

DESCRIPTION OF THE RELATED ART

Liftgates are often used with cargo vehicles or delivery vehicles. A liftgate is movable vertically, being movable between a raised position (such as even with a cargo bed of the vehicle) and a ground level (below the cargo bed). Liftgates facilitate the loading and unloading of cargo. However, a significant amount of energy is required for raising and lowering the liftgate of vehicles such as delivery vehicles, which may make multiple deliveries in the course of a delivery route. In addition, energy consumption can be of increased importance with the rise of limited-range vehicles, such as electric vehicles.

SUMMARY OF THE INVENTION

The present disclosure includes a liftgate (tail lift) assembly, which comprises an energy recovery mechanism that stores energy when the liftgate is being lowered, such as under load, for subsequent use in raising the liftgate, such as after the load is removed.

According to an aspect of the disclosure, a liftgate assembly includes: a liftgate that is movable from a raised position to a lowered position; and a hydraulic power unit usable to raise the liftgate from the lowered position. The hydraulic power unit includes an energy-recovery mechanism configured to store energy while the liftgate is being lowered under load, and to use the energy stored by the energy-recovery mechanism subsequently to raise the liftgate. The hydraulic power unit includes a pump that pumps hydraulic fluid from a reservoir. The energy-recovery mechanism includes an accumulator that is configured to receive hydraulic fluid while the liftgate is being lowered under load, to store the energy.

According to another aspect of the disclosure, a liftgate assembly includes: a liftgate that is movable from a raised position to a lowered position; means to selectively raise and lower the liftgate; and energy-recovery means to capture at least some energy from lowering the liftgate, for use in subsequently raising the liftgate.

According to still another aspect of the disclosure, a method of unloading a product from a vehicle using a liftgate, the method includes: storing energy in a hydraulic accumulator while the liftgate is being lowered under with the product on the liftgate; after the lowering, removing the product from the liftgate; and after the removing, using the energy from the hydraulic accumulator to raise the liftgate.

According to another aspect of the disclosure, a liftgate assembly includes: a liftgate that is movable from a raised position to a lowered position; and a hydraulic power unit usable to raise the liftgate from the lowered position; wherein the hydraulic power unit includes an energy-recovery mechanism configured to store energy while the liftgate is being lowered under load, and to use the energy stored by the energy-recovery mechanism subsequently to raise the liftgate; wherein the hydraulic power unit includes a pump that pumps hydraulic fluid from a reservoir; and wherein the energy-recovery mechanism includes an accumulator that is configured to receive hydraulic fluid while the liftgate is being lowered under load, to store the energy.

According to an embodiment of any paragraph(s) of this summary, the liftgate assembly is part of a vehicle, such as a delivery vehicle or cargo vehicle.

According to an embodiment of any paragraph(s) of this summary, the accumulator is a hydraulic accumulator.

According to an embodiment of any paragraph(s) of this summary, the accumulator includes a gas that is compressed by flow of pressurized hydraulic fluid into the accumulator.

According to an embodiment of any paragraph(s) of this summary, the gas is or includes nitrogen.

According to an embodiment of any paragraph(s) of this summary, the energy-recovery mechanism further includes a gas pressure sensor that measures pressure of the gas of the accumulator.

According to an embodiment of any paragraph(s) of this summary, the liftgate assembly further includes an electric motor that is operatively connected to the pump, to drive the pump.

According to an embodiment of any paragraph(s) of this summary, the energy-recovery mechanism includes an accumulator lock valve that controls flow of the hydraulic fluid to and from the accumulator.

According to an embodiment of any paragraph(s) of this summary, the accumulator lock valve is a solenoid accumulator lock valve.

According to an embodiment of any paragraph(s) of this summary, the energy-recovery mechanism includes an accumulator relief valve that prevents overpressurizing of the accumulator by opening to allow flow of the hydraulic fluid to the reservoir when a predetermined pressure in the accumulator is exceeded.

According to an embodiment of any paragraph(s) of this summary, the pump outputs the hydraulic fluid through a high pressure line, to a high pressure side of a hydraulic cylinder.

According to an embodiment of any paragraph(s) of this summary, the high pressure side of the hydraulic cylinder/ram is on an opposite side of a piston head from a piston rod.

According to an embodiment of any paragraph(s) of this summary, a low pressure side of the hydraulic cylinder/ram is connected by a low pressure line to the reservoir.

According to an embodiment of any paragraph(s) of this summary, the low pressure side of the hydraulic cylinder/ram is a rod side of the piston head.

According to an embodiment of any paragraph(s) of this summary, the hydraulic power unit further includes a ram lock valve in the high pressure line, for selectively retaining high pressure in one side of the hydraulic cylinder.

According to an embodiment of any paragraph(s) of this summary, the ram lock valve is a solenoid ram lock valve.

According to an embodiment of any paragraph(s) of this summary, the hydraulic power unit further includes an oil pressure sensor in the high pressure line.

According to an embodiment of any paragraph(s) of this summary, the oil pressure sensor senses pressure between the ram lock valve and the hydraulic cylinder.

According to an embodiment of any paragraph(s) of this summary, the accumulator is fluidly coupled to the high pressure line.

According to an embodiment of any paragraph(s) of this summary, the hydraulic power unit includes a lowering valve for selectively directing hydraulic fluid from the high pressure line to the reservoir.

According to an embodiment of any paragraph(s) of this summary, the lowering valve is a solenoid lowering valve.

According to an embodiment of any paragraph(s) of this summary, the hydraulic cylinder/ram includes a piston with a piston rod, wherein the piston rod is extended to raise the liftgate.

According to an embodiment of any paragraph(s) of this summary, the piston rod is attached to a ram head of the hydraulic cylinder/ram.

According to an embodiment of any paragraph(s) of this summary, the ram head is operatively coupled to a mechanical mechanism for raising and lowering the liftgate.

According to an embodiment of any paragraph(s) of this summary, the ram head is operatively coupled to a pair of chains for raising the liftgate.

According to an embodiment of any paragraph(s) of this summary, the ram head includes a pair of sprockets engaging respective of the chains.

According to an embodiment of any paragraph(s) of this summary, the liftgate assembly further including intermediate sprockets that engage respective of the chains between the liftgate, and the sprockets of the ram head.

According to an embodiment of any paragraph(s) of this summary, the chains proceed through sliders that are mechanically coupled to the liftgate.

According to an embodiment of any paragraph(s) of this summary, ends of the chains are attached to one or more chain anchors.

According to an embodiment of any paragraph(s) of this summary, the chains are attached to respective sliders.

According to an embodiment of any paragraph(s) of this summary, the sliders slide within respective columns.

According to an embodiment of any paragraph(s) of this summary, the sliders include a curbside slider and a doorside slider.

According to an embodiment of any paragraph(s) of this summary, the hydraulic power unit is in a housing of the liftgate assembly.

According to an embodiment of any paragraph(s) of this summary, the one or more chain anchors are fixed to the housing.

According to an embodiment of any paragraph(s) of this summary, the hydraulic cylinder/ram is also in the housing.

According to an embodiment of any paragraph(s) of this summary, the intermediate sprockets are in respective opposite corners of the housing.

According to an embodiment of any paragraph(s) of this summary, the opposite corners where the intermediate sprockets are located include a driver side corner and a curbside corner.

According to an embodiment of any paragraph(s) of this summary, the liftgate assembly further includes an operator control unit that allows the operator of the liftgate to control the raising and lowering of the liftgate.

According to an embodiment of any paragraph(s) of this summary, the operator control unit includes an up selector for raising the liftgate using the pump.

According to an embodiment of any paragraph(s) of this summary, the operator control unit includes a down selector for lowering the liftgate.

According to an embodiment of any paragraph(s) of this summary, the operator control unit includes multiple selectors for lowering the liftgate with different functionality.

According to an embodiment of any paragraph(s) of this summary, the multiple selectors for lowering the liftgate include a selector for lowering without energy recovery.

According to an embodiment of any paragraph(s) of this summary, the multiple selectors for lowering the liftgate include a selector for lowering with energy recovery.

According to an embodiment of any paragraph(s) of this summary, the selector for lowering with energy recovery is an unload selector.

According to an embodiment of any paragraph(s) of this summary, the selector for lowering with energy recovery engages the energy recovery mechanism.

According to an embodiment of any paragraph(s) of this summary, the selector for lowering with energy recovery is operable only when a load on the liftgate exceeds a threshold load.

According to an embodiment of any paragraph(s) of this summary, the selector for lowering with energy recovery is also used to raise the liftgate using energy stored by the energy-recovery mechanism.

According to an embodiment of any paragraph(s) of this summary, the selectors include buttons on the operator control unit.

According to an embodiment of any paragraph(s) of this summary, the liftgate assembly further includes a position sensor that senses position of the liftgate.

According to an embodiment of any paragraph(s) of this summary, the liftgate assembly further includes a controller that outputs signals to at least some controllable components of hydraulic power unit.

According to an embodiment of any paragraph(s) of this summary, inputs for the controller include selections from the operator control unit.

According to an embodiment of any paragraph(s) of this summary, inputs for the controller include position of the liftgate.

According to an embodiment of any paragraph(s) of this summary, inputs for the controller include gas pressure in the accumulator.

According to an embodiment of any paragraph(s) of this summary, inputs for the controller include hydraulic fluid (oil) pressure from the high pressure line and/or high pressure side of the hydraulic cylinder/ram.

According to an embodiment of any paragraph(s) of this summary, the signals to at least some controllable components of hydraulic power unit include a signal to run (or stop running) the pump.

According to an embodiment of any paragraph(s) of this summary, the signals to at least some controllable components of hydraulic power unit include a signal to open (or close) the ram lock valve.

According to an embodiment of any paragraph(s) of this summary, the signals to at least some controllable components of hydraulic power unit include a signal to open (or close) the accumulator lock valve.

According to an embodiment of any paragraph(s) of this summary, the signals to at least some controllable components of hydraulic power unit include a signal to open (or close) the lowering valve.

According to an embodiment of any paragraph(s) of this summary, the energy-recovery mechanism converts potential energy of lowering the liftgate to compressed gas energy as the liftgate is lowered from the raised portion to the lowered position.

According to an embodiment of any paragraph(s) of this summary, the raised position is a vehicle bed height position.

According to an embodiment of any paragraph(s) of this summary, the lowered position is a ground level position.

According to an embodiment of any paragraph(s) of this summary, the energy-recovery mechanism is operable during lowering of the liftgate only when a load on the liftgate exceeds a threshold load.

According to an embodiment of any paragraph(s) of this summary, the threshold load is 150 kg.

According to an embodiment of any paragraph(s) of this summary, the threshold load is about 150 kg.

According to an embodiment of any paragraph(s) of this summary, the threshold load is within an order of magnitude of 150 kg.

According to an embodiment of any paragraph(s) of this summary, the threshold load is fixed.

According to an embodiment of any paragraph(s) of this summary, the threshold load is adjustable.

According to an embodiment of any paragraph(s) of this summary, the threshold load is adjustable by adjusting a pre-charge pressure of the accumulator.

According to an embodiment of any paragraph(s) of this summary, the threshold load is set by a pre-charge pressure of the accumulator.

According to another aspect of the disclosure, a liftgate assembly includes: a liftgate that is movable from a raised position to a lowered position; means to selectively raise and lower the liftgate; and energy-recovery means to capture at least some energy from lowering the liftgate, for use in subsequently raising the liftgate.

According to yet another aspect of the disclosure a method of unloading a product from a vehicle using a liftgate, the method includes: storing energy in a hydraulic accumulator while the liftgate is being lowered under with the product on the liftgate; after the lowering, removing the product from the liftgate; and after the removing, using the energy from the hydraulic accumulator to raise the liftgate.

According to an embodiment of any paragraph(s) of this summary, the storing energy occurs only when a load on the liftgate exceeds a threshold load.

According to an embodiment of any paragraph(s) of this summary, the storing energy occurs only when activated by an operator.

According to an embodiment of any paragraph(s) of this summary, the activation by the operator includes making a selection on an operator control unit.

According to an embodiment of any paragraph(s) of this summary, the storing energy occurs only when a load on the liftgate exceeds a threshold load, and when activated by an operator.

According to an embodiment of any paragraph(s) of this summary, the storing energy includes opening an accumulator lock valve, to allow flow of hydraulic fluid (oil) into the hydraulic accumulator.

According to an embodiment of any paragraph(s) of this summary, the storing energy includes opening a ram lock valve, to allow flow of hydraulic fluid (oil) from a hydraulic cylinder/ram.

According to an embodiment of any paragraph(s) of this summary, the using the energy from the hydraulic accumulator to raise the liftgate occurs only when activated by an operator.

According to an embodiment of any paragraph(s) of this summary, the activation by the operator to use the energy from the hydraulic accumulator to raise the liftgate is the same as the activation used for the storing energy while the liftgate is being lowered.

According to an embodiment of any paragraph(s) of this summary, when the liftgate is lowered, and when the activation of the operator is released, the method includes de-energizing a ram lock valve and an accumulator valve.

According to an embodiment of any paragraph(s) of this summary, following the activation of the operator being released, the removing the product from the liftgate occurs.

According to an embodiment of any paragraph(s) of this summary, after the releasing of the activation of the operator, and after the removing the product from the liftgate occurs, activating the activation to raise the liftgate using the stored energy from the hydraulic accumulator.

According to an embodiment of any paragraph(s) of this summary, the raising includes energizing (or opening) a ram lock valve and an accumulator valve, allowing pressurized hydraulic fluid to flow from the accumulator to the hydraulic cylinder/ram.

According to an embodiment of any paragraph(s) of this summary, if the energy from the accumulator is insufficient to fully raise the liftgate, enabling the further raising of the liftgate using a hydraulic pump to provide pressurized hydraulic fluid to the hydraulic cylinder/ram.

According to an embodiment of any paragraph(s) of this summary, the enabling includes the operator making a selection to enable the further raising.

According to an embodiment of any paragraph(s) of this summary, the operator making a selection includes the operator making the selection on an operator control unit.

According to an embodiment of any paragraph(s) of this summary, the making the selection on the operator control unit includes making a different selection on the operator control unit than a selection used for engaging the storing of the energy.

According to an embodiment of any paragraph(s) of this summary, the method further includes raising the liftgate using hydraulic power.

According to an embodiment of any paragraph(s) of this summary, the method further includes preventing overpressuring of the hydraulic accumulator.

According to an embodiment of any paragraph(s) of this summary, the preventing overpressuring of the hydraulic accumulator includes using a relief valve to prevent the overpressuring.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A liftgate assembly, such as a for a delivery vehicle, includes a liftgate that is movable by hydraulic power between a raised position and a lowered position. The hydraulic power unit includes an energy-recovery mechanism that stores energy while the liftgate is being lowered under load. Energy stored by the energy-recovery mechanism, such as in an accumulator, may be used to raise the liftgate. The hydraulic power unit includes a pump that pumps hydraulic fluid for providing hydraulic pressure. The liftgate assembly thereby uses energy more efficiently, enabling repurposing part of the energy from lowering the liftgate (and any cargo thereupon) in raising the liftgate.

Figure 1:
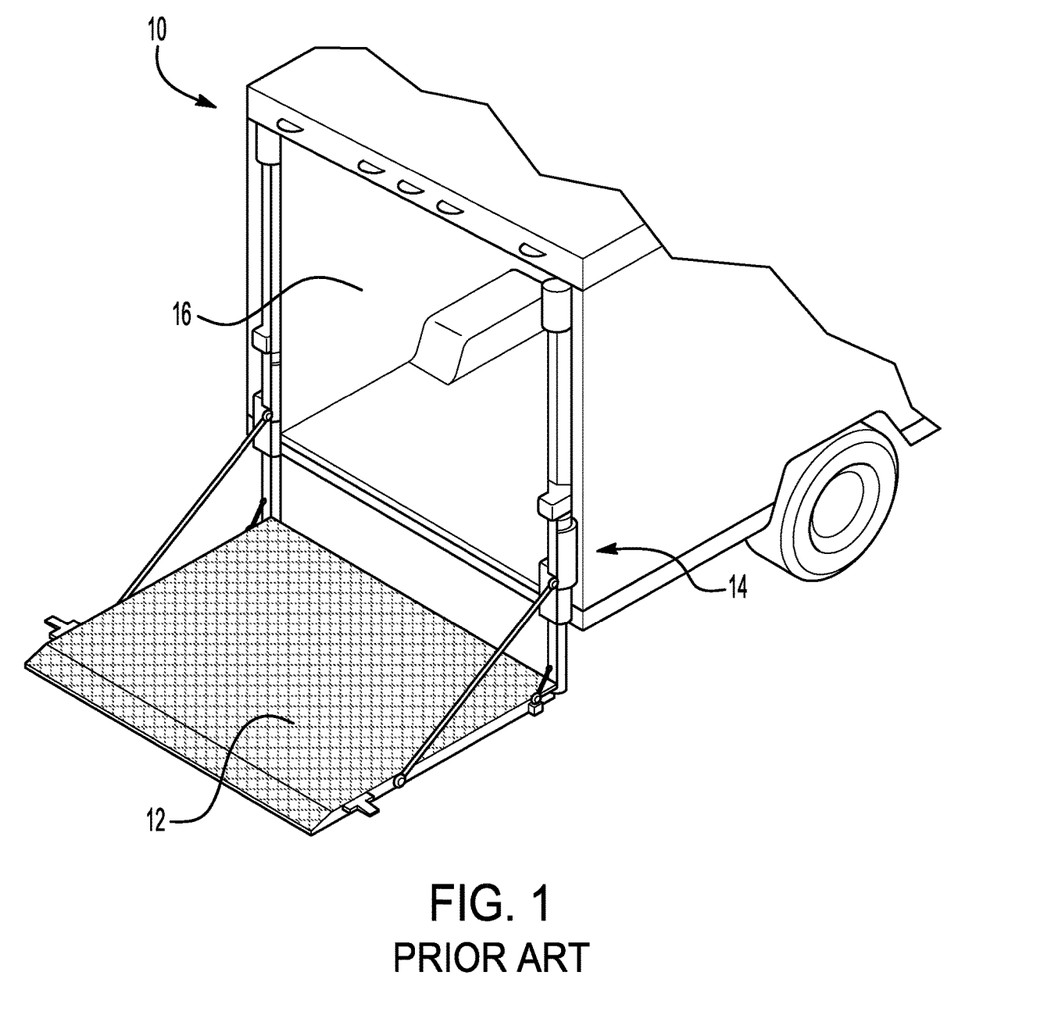
FIG. 1 is an oblique view of a portion of vehicle with a liftgate.

FIG. 1 shows a prior art arrangement of a vehicle 10 that includes a liftgate (tail lift) 12. The liftgate 12 may be used in loading and unloading cargo from the vehicle 10, and as such the vehicle 10 includes a means 14 for selectively raising and lowering the liftgate 12. The means 14 may include electrical, hydraulic, and/or mechanical components. The raised level for the liftgate 12 may be at about a level of a bed 16 of the vehicle 10, allowing (for instance) cargo to slide between the liftgate 12 and the bed 16 (or be otherwise moved between the liftgate 12 and the bed 16 without vertical movement (change in height)). The lowered position may be at a level of the ground around the vehicle 10. This allows movement of cargo on and off the lowered liftgate 12 by sliding or by movements otherwise with no or minimal need to lift (change height) of the cargo.

Figure 2:
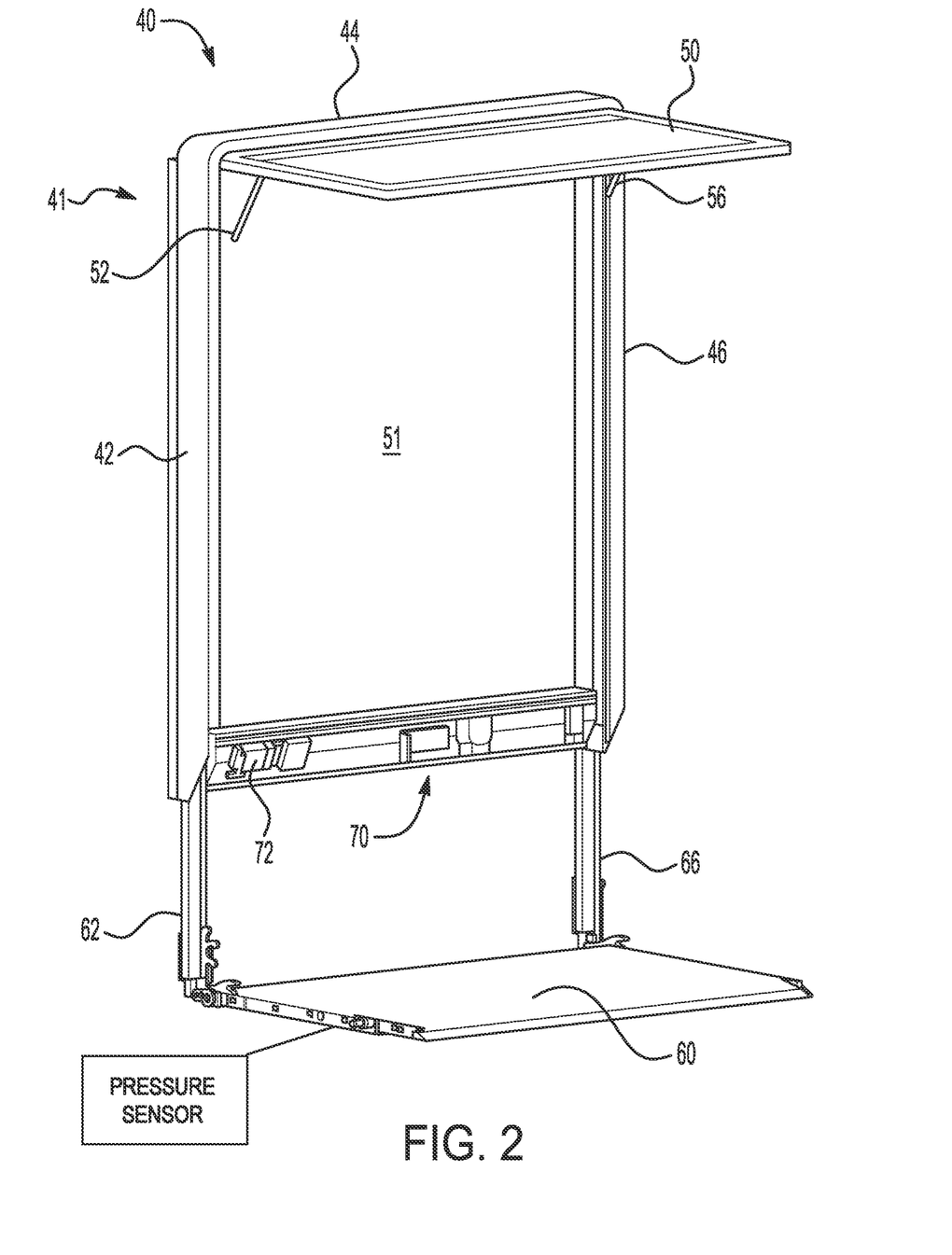
FIG. 2 is an oblique view of parts of a liftgate (tail lift) assembly according to an embodiment of the invention.

FIG. 2 shows a liftgate (tail lift) assembly 40 that may be used as part of a of vehicle, such as a delivery vehicle or cargo vehicle. The liftgate assembly 40 may include portions of a rear frame 41 of the vehicle, such as a driver side (left) column 42, a top frame 44, and a curb side (right) column 46.

A top door 50 is able to pivot upward to uncover a top portion of an opening 51 defined by the frame parts 42-46. The pivoting of the top door 50 may be a relatively simple operation, for example with the top door 50 being maintained in an open position (the position shown in FIG. 2) by a pair of gas-filled struts 52 and 56 on the columns 42 and 46, respectively.

A liftgate (tail lift) 60 pivots down from covering a bottom portion of the opening 51. The liftgate 60 also may be moved vertically, up and down. Toward that end that the liftgate 60 is supported on opposite sides by sliders 62 and 66 that move up and down relative to the columns 42 and 46. The sliders 62 and 66 extend out the columns 42 and 46 as the liftgate 60 moves downward, and are retracted back into the columns 42 and 46 (or overlapping the columns 42 and 46) as the liftgate 60 moves upward.

Figure 3:
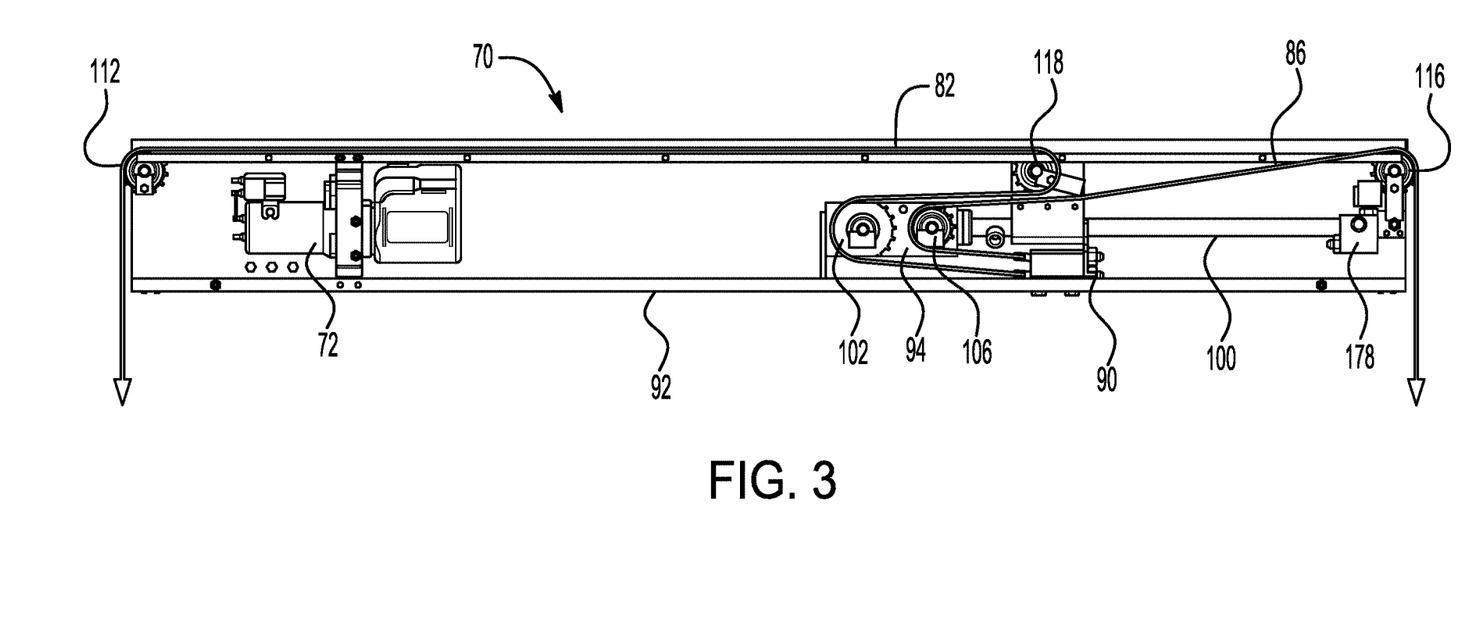
FIG. 3 is an end view of a housing assembly of the tail lift assembly of FIG. 2.
Figure 4:
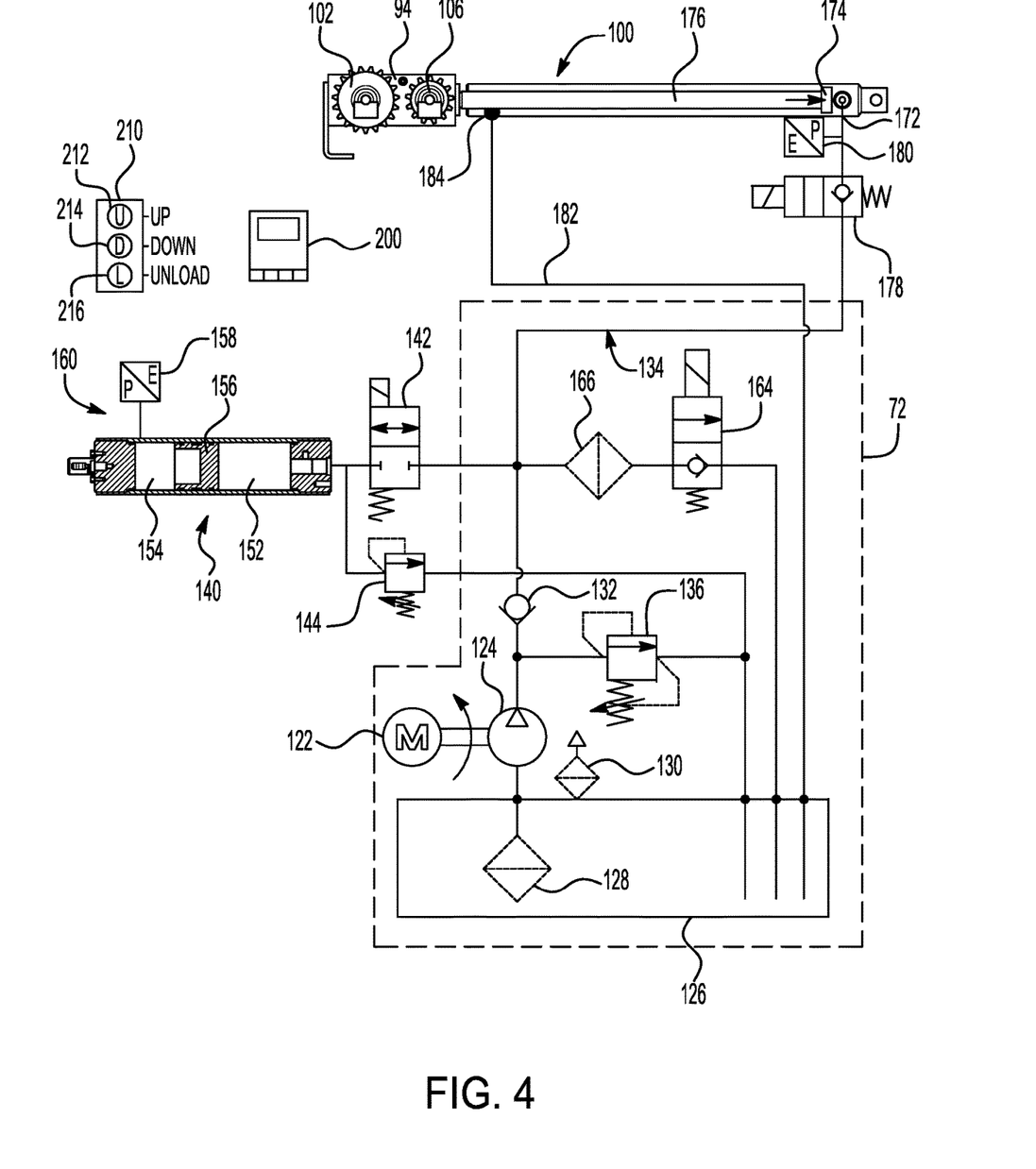
FIG. 4 is a hydraulic schematic of liftgate assembly of FIG. 2.

A housing assembly 70 houses a mechanism, a hydraulic power unit 72, to raise and lower the liftgate 60. FIGS. 3 and 4 show further details of the hydraulic power unit 72 and its operation. The lift chains 82 and 86 are mechanical elements to lift and lower the sliders 62 and 66 (FIG. 2), providing the mechanical connection from the hydraulic power unit 72 to the liftgate 60. The lift chains 82 and 86 are both fixed to a chain anchor 90 that is in turned fixedly attached to a housing 92.

The chains 82 and 86 both extend from the chain anchor to a ram head 94. The ram head 94 is slidable within the housing 92, its movement being controlled by a hydraulic cylinder/ram 100. The ram head 94 includes a pair of sprockets 102 and 106, which engage the respective chains 82 and 86, redirecting the chains 82 and 86 toward corner sprockets 112 and 116 at the respective corners of the housing 92. The chain 82 interfaces with an intermediate sprocket 118, between the ram head 94 and the corner sprocket 112, to change the direction of the chain 82.

The hydraulic power unit 72 controls operation of the hydraulic cylinder/ram 100. Referring primarily to the hydraulic schematic shown in FIG. 4, an electric motor 122 powers (drives) a pump 124, which draws hydraulic fluid from a reservoir 126, through a suction filter 128. The reservoir 126 may have an oil filter cap 130, used in adding hydraulic fluid (oil) to the reservoir 126. Output from the pump 124 passes through a check valve 132 and into a hydraulic pressure line 134. A relief valve 136 is set to relieve any overpressure between the pump 124 and the check valve 132, with any flow from the relief valve 136 dumped to the reservoir 126.

The hydraulic pressure line 134 is also coupled to an accumulator 140, through an accumulator lock valve 142. The accumulator 140 is used for storing energy as the liftgate 60 (FIG. 2) is lowered, for subsequent use in raising the liftgate 60, as is described further below. The accumulator may be a piston-style accumulator, as in the illustrated embodiment. Alternatively the accumulator may be a bladder-like accumulator or diaphragm-like accumulator, without a piston.

The accumulator lock valve 142 is a solenoid valve that controls flow of hydraulic fluid to and from the accumulator 140. There is also an accumulator relief valve 144 to prevent overpressure in the accumulator 140. The output from the accumulator relief valve 144 dumps to the reservoir 126.

The accumulator 140 includes an oil (hydraulic fluid) chamber 152 and a gas chamber 154, separated by a piston 156. As noted above, a bladder-like or diaphragm-like accumulator may be used as an alternative to the illustrated accumulator 140. A gas pressure sensor 158 measures the pressure in the gas chamber 154, which corresponds to the pressure in the oil chamber 152. The gas pressure measured by the sensor 158 may be used as an input for control and operation of the system, as described further below. Gas in the gas chamber 154, such as nitrogen or a gas that includes nitrogen, is compressed by flow of pressurized hydraulic fluid into the oil chamber 152 of the accumulator 140.

The accumulator 140 functions as part of an energy-recovery mechanism 160 configured to store energy while the liftgate 60 (FIG. 2) is being lowered under load, and to use the energy stored by the energy-recovery mechanism 160 subsequently to raise the liftgate 60. In doing so the accumulator 140 is configured to receive hydraulic fluid while the liftgate 60 is being lowered under load, to store the energy. Other parts, such as the accumulator lock valve 142, the accumulator relief valve 144, and/or the gas pressure sensor 158, may also be considered part of the energy-recovery mechanism 160.

The hydraulic pressure line 134 is also able to return to the reservoir 126 through a lowering solenoid valve 164, with a filter 166 located upstream of the lowering solenoid valve 164. The lowering solenoid valve 164 may be either opened, to allow free flow from the hydraulic pressure line 134 to the reservoir 126, or closed to prevent from the hydraulic pressure line 134 to the reservoir 126.

The hydraulic pressure line 134 is coupled a piston-side port 172 in the hydraulic cylinder/ram 100. The piston-side port 172 is a high-pressure side of the cylinder/ram 100, on the open side of a piston head 174, opposite the side of the piston head 174 where a piston rod 176 is connected to the piston head 174. The piston rod 176 is mechanically coupled (attached) to the ram head 94 (FIG. 3). The connection between the hydraulic pressure line 134 and the port 172 passes through a ram lock valve 178, a solenoid valve that can selectively either provide for flow in either direction, into or out of the port 172, or can be placed in a closed position, maintain pressure in the piston side of the cylinder/ram 100. An oil pressure sensor 180 may measure the pressure at the port 172. As an alternative to the illustrated oil pressure sensor a gas pressure sensor may be used. Pressure measurements may be used as part of the control of the system, but use of pressure in control is not necessary, and should be considered optional.

A rod-side vent (return) line 182 is connected to a rod-side port 184 of the hydraulic cylinder/ram 100. The rod-side port 184 is on the low-pressure side of the cylinder/ram 100, on the rod side of the piston head 174. The vent line 182 allows flow of air from a rod side of the hydraulic cylinder/ram 100 to the reservoir 126.

A controller 200 may be coupled to components of the hydraulic power unit 72, specifically to control controllable components of the hydraulic power unit 72, such as the various solenoid valves discussed above. The controller 200 has inputs that may include one or more of selections from a control unit 210 (which may be controllable by an operator of the vehicle or the liftgate on the vehicle), a position of the liftgate 60 (as may be determined from a sensor on the liftgate 60 or another movable part of the mechanical or hydraulic system), gas pressure in the accumulator 140, and pressure in the high pressure line 134. The controller 200 may output signals to control various valves, for example a signal to open (or close) the ram lock valve, a signal to open (or close) the accumulator lock valve, and a signal to open (or close) the lowering valve.

The controller 200 may be any combination of hardware and/or software for executing the functions described herein. For example the controller 200 may include general-purpose or dedicated circuitry, for example with electronics such as integrated circuits.

The control unit 210 may be operable by a driver or other worker/operator, allowing inputs to instruct the system to raise and lower the liftgate 60 (FIG. 2). The control unit 210 may be a series of buttons or other selectors, located on the vehicle or elsewhere. The selectors may include an up selector 212 for raising the liftgate 60 using the pump 124; a down selector 214 for lowering the liftgate 60; and an unload selector 216, also for lowering the liftgate 60. The selector 214 may be for lowering the liftgate 60 without energy recovery, and the selector 216 for lowering with energy recovery, by engaging the energy recovery mechanism 160.

The control unit 210 may allow for the operator to select engagement of the energy recovery system. Alternatively or in addition, the engagement of the energy recovery system may occur only when a load on the liftgate exceeds a threshold load. An example threshold load is 150 kg. The determination of when the threshold load is met may be based on a pressure sensor, for example incorporated into the liftgate 60 (FIG. 2), or utilizing the gas pressure sensor 158. The threshold load may be fixed, or may adjustable, such as by adjusting gas pressure in the accumulator 140, for example by adjusting the pre-charge of gas in the accumulator 140.

As an alternative to the illustrated control unit 210, the control unit may instead have only two selectors, one for raising the liftgate and the other for lowering the liftgate. In such an arrangement the engagement of the energy recovery mechanism 160 may be controlled automatically by the controller 200, without input from the operator. The engagement and operation of the energy recovery mechanism 160 may be controlled based on parameters from the assembly 40 (FIG. 2), such as the various pressures measured by the pressure sensors in the system, and/or other parameters such as position of the liftgate 60 (FIG. 2).

Figure 5:
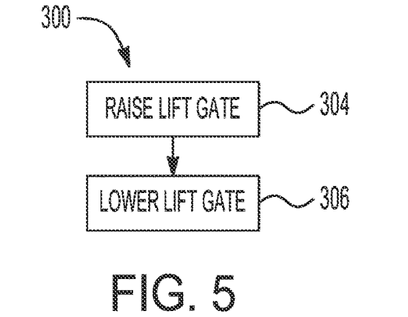
FIG. 5 is a high-level flow chart of operation of the liftgate assembly of FIG. 2.

With reference now to FIG. 5, steps of a method 300 for operation of a liftgate assembly, such as the liftgate assembly 40 (FIG. 2), operating without energy recovery.

In step 304 the liftgate (tail lift) 60 (FIG. 2) is raised. When the "up" button 212 (FIG. 4) on the control unit 210 (FIG. 4) is pressed, the electric motor 122 (FIG. 4) drives the pump 124 (FIG. 4) to provide hydraulic oil pressure routed thru the non-return valve 132 (FIG. 4) and the de-energized check-valve flow port of ram lock-valve 178 (FIG. 4), and into the piston-side port 172 (FIG. 4) of the ram 100 (FIG. 3). This extends the ram head 94 (FIG. 3), which in turn raises the tail lift platform 60.

In step 306 the liftgate 60 (FIG. 2) is lowered. When the "down" button 214 (FIG. 4) on the control unit 210 (FIG. 4) is pressed, the ram lock valve 178 (FIG. 4) and the lowering valve 164 (FIG. 4) are energized allowing oil to flow freely from the ram/piston 100 (FIG. 3) due to the weight of the liftgate 60. The hydraulic oil flows back to the reservoir 126.

Figure 6:
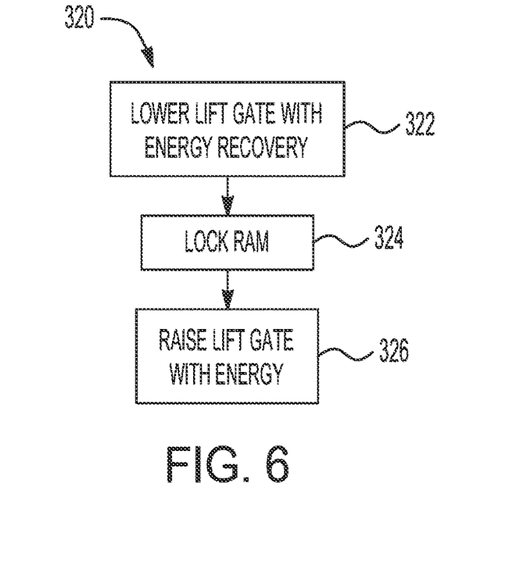
FIG. 6 is another high-level flow chart of operation of the liftgate assembly of FIG. 2.

FIG. 6 shows steps of a method 320 for operating the liftgate assembly 40 (FIG. 2), using the energy recovery mechanism 160 (FIG. 4). In this operation a portion of the potential energy of each platform cargo load is converted to compressed gas energy in the accumulator 140 (FIG. 4) as the load is lowered from truck bed height to the ground. This compressed gas energy is later used to power the empty platform back to bed height, thereby eliminating the need to run the battery powered pump for truck (or other vehicle) unloading applications.

In step 322, with the liftgate 60 (FIG. 2) starting at vehicle bed height (raised position), the unload button 216 (FIG. 4) on the control unit 210 (FIG. 4) is pushed to activate lower of the liftgate 60 with energy recovery. The ram lock valve 178 (FIG. 4) and the accumulator valve 142 (FIG. 4) are energized. This allows hydraulic oil to flow under the pressure of the load on the liftgate 60, from the piston-side port 172 of the ram 100 (FIG. 4) into the hydraulic accumulator 140. In the accumulator 140 the pressurized hydraulic oil compresses the gas in the chamber 154, as long as the load on the platform is greater than a threshold amount, while the platform (liftgate) 60 descends to ground. If load is not great enough, the platform 60 will stall and must be lowered using the down pushbutton 214 (FIG. 4) on the control unit 210 (FIG. 4).

Once the liftgate platform 60 (FIG. 4) reaches the ground and the unload button 216 (FIG. 4) is released, in step 324 the ram lock valve 178 (FIG. 4) and the accumulator valve 142 (FIG. 4) are de-energized and moved to their spring-loaded states. This locks the position of the ram 100 (FIG. 4) and stores the compressed gas energy in the hydraulic accumulator 140 (FIG. 4). Now the cargo can be removed from the platform 60.

Once the load is removed from the platform (liftgate) 60 (FIG. 4), in step 326 the liftgate 60 is raised. The unload button 216 (FIG. 4) is pressed on the control unit 210 (FIG. 4). The ram lock valve 178 (FIG. 4) and the accumulator valve 142 (FIG. 4) are energized, allowing oil to flow from the oil chamber 152 (FIG. 4) of the accumulator 140 (FIG. 4), under the compressed gas pressure in the chamber 154 (FIG. 4), sending the hydraulic oil to the piston-side port 172 (FIG. 4) of the piston (FIG. 4). This is done with enough energy to extend the piston rod 176 (FIG. 4) and the ram head 94. This lifts the empty platform 60 back to bed height. If there is not enough compressed gas energy to overcome the empty platform weight, the platform 60 will stall and must be raised using the up button 212 (FIG. 4) on the control unit 210.

The accumulator relieve valve 144 (FIG. 4) prevents excess compressed gas pressure in the accumulator 140 (FIG. 4) by relieving the pressure in the oil chamber 152 if the maximum desired gas pressure is exceeded, such as in the event the operator too often uses the unload pushbutton 216 (FIG. 4) to lower the loaded platform, while in conjunction using the up pushbutton 212 (FIG. 4) to raise the platform 60 (FIG. 2) through use of pump power.

Figure 7:
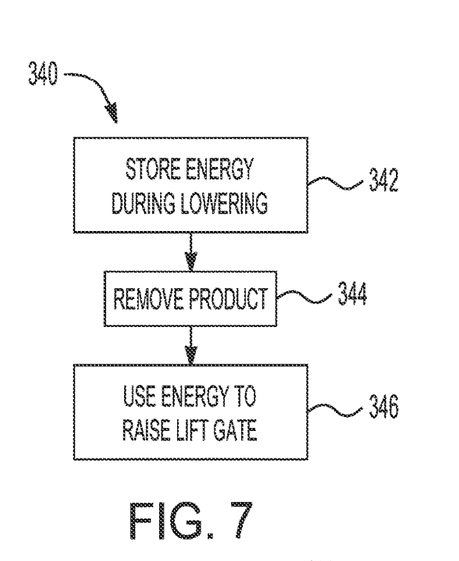
FIG. 7 is still another high-level flow chart of operation of the liftgate assembly of FIG. 2.

FIG. 7 shows high-level steps of a method 340 for unloading a product from a vehicle using a liftgate, such as the liftgate 60 (FIG. 2). In step 342 energy is stored in the hydraulic accumulator 140 (FIG. 4) while the liftgate 60 is being lowered under load with the product on the liftgate 60. In step 344, after the lowering, the product is removed from the liftgate 60. In step 346, after the removing, the energy from the hydraulic accumulator 140 is used to raise the liftgate 60.

Figure 8:
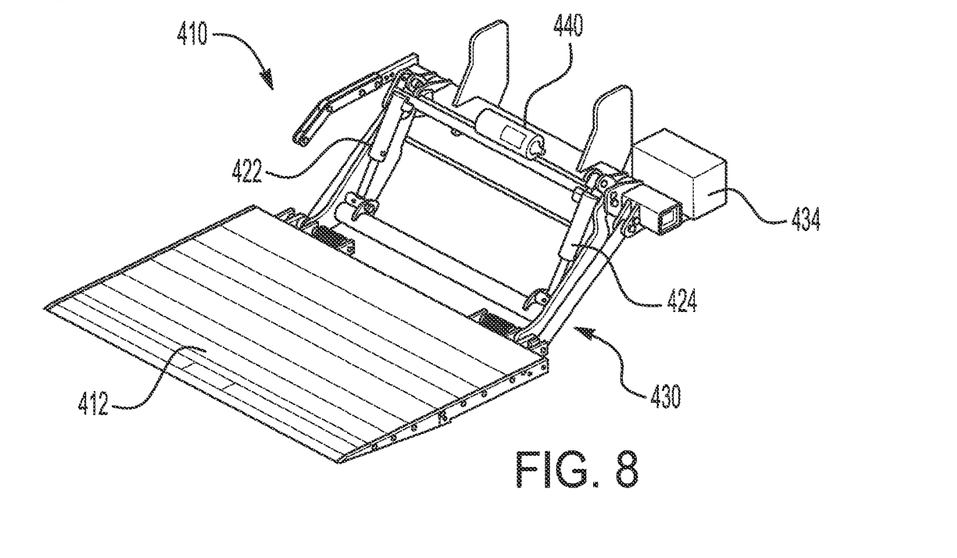
FIG. 8 is an oblique view of a lift platform assembly according to another embodiment of the invention.

Many alternative configurations are possible. FIG. 8 shows a liftgate assembly 410 that includes a load gate (tail lift platform) 412 that is raised and lowered by a pair of hydraulic cylinders 422 and 424 that are operatively coupled a mechanical linkage 430. A hydraulic pump 434 provides pressurized fluid to the cylinders 422 and 424, retracting the cylinders 422 and 424 to raise the load platform 412, and extending the cylinders 422 and 424. The cylinders 422 and 424 are coupled to an accumulator 440, which may be used for energy recovery.

Figure 9:
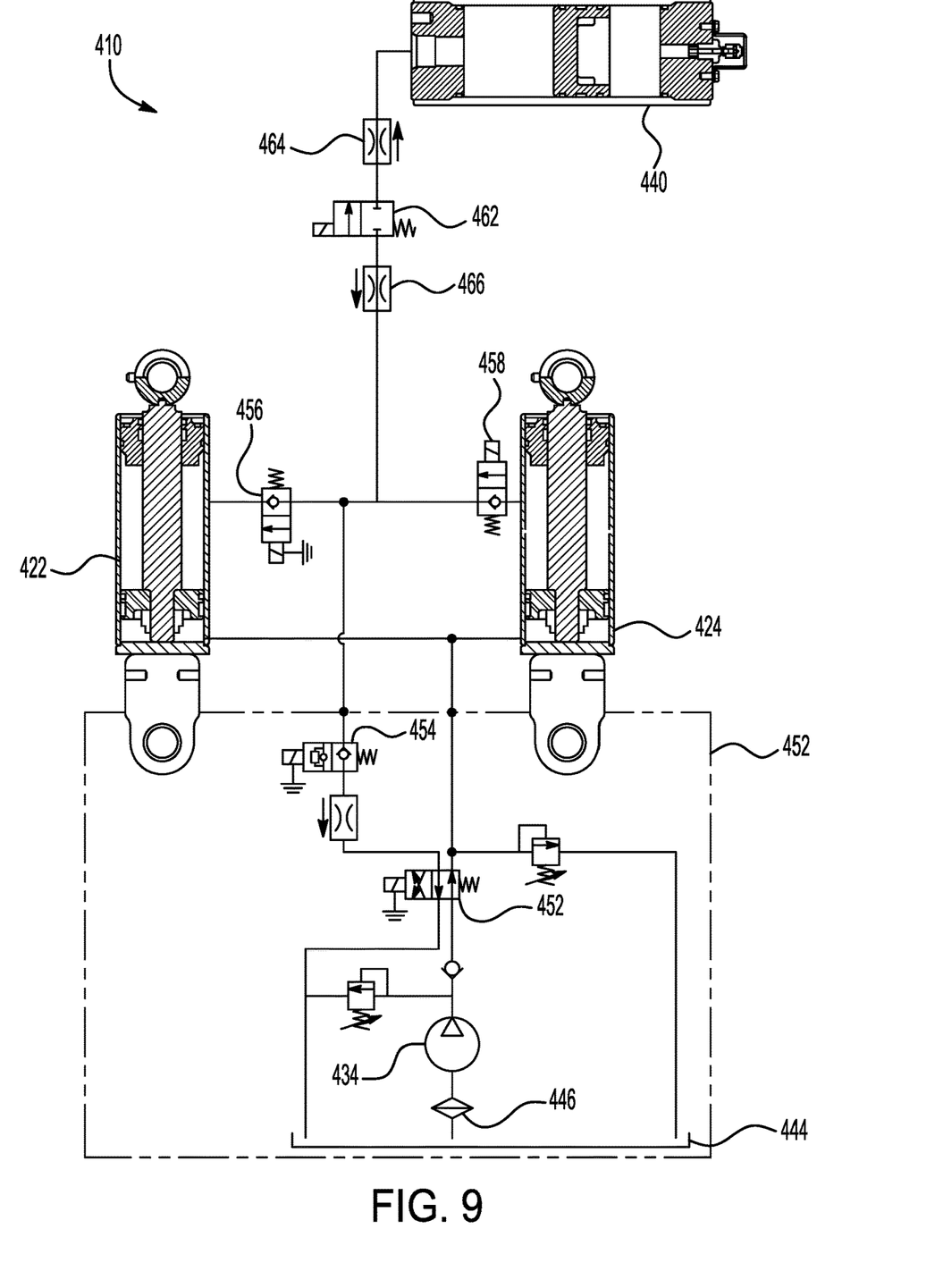
FIG. 9 is a hydraulic schematic of lift platform assembly of FIG. 8.

With reference in addition to FIG. 9, the assembly 410 may be operated without energy recovery as follows. In raising the load gate 412 the pump 434, which may be an electric-motor-driven pump, draws hydraulic fluid from a reservoir 444, through a filter 446. The hydraulic pressure is routed through an energized cross-flow path of a raise solenoid valve 452, and de-energized check-valve flow ports of a lower valve 454 and lock valves 456 and 458, and into the rod side of the cylinders 422 and 424. This retracts the cylinders 422 and 424, thereby raising the load platform 412.

To lower the load platform 412 the lock valves 456 and 458, and the lower valve 454, are energized. This allows hydraulic fluid (oil) to flow freely from the cylinders back to the pump reservoir 444. At the same time the pump 434 runs, to provide hydraulic pressure through a flow path of the de-energized raise valve, to the piston sides of the cylinders 422 and 424. This extends the cylinders 422 and 424, lowering the load platform 412.

In an energy recovery mode of operation, a portion of the potential energy of a platform load is converted to compressed air (more broadly, compressed gas) energy as the load is lowered from bed height to the ground. This compressed air energy is captured in the accumulator 440. The compressed air energy may be later used to help raise the empty load platform 412 back to bed height. This eliminates (or reduces) the need to run the battery-powered pump for unloading applications.

An energy valve 462 is used to control flow of hydraulic fluid to and from the accumulator 440, and speed controls 464 and 466 may limit the rate of such flow. The pre-charge of compressed gas in the accumulator 440 may determine a minimum load required to lower the platform 412.

When the energy recovery mechanism is activated the raise valve 452, the lock valves 456 and 458, and the energy valve 462, are energized. This allows fluid to flow from the rod sides of the cylinders 422 and 424, through the speed control 464 and into the accumulator 440. In the accumulator 440 the pressurized fluid compresses the air as long as the load on the platform 412 exceeds a predetermined threshold, such as 150 kg, with the threshold being adjustable by adjusting the charged air pressure initially in the accumulator 440. The platform 412 descends to the ground with adjustable speed, as determined by the speed control 464. At the same time, oil is drawn from the pump reservoir 444, through the cross-flow ports of the raise valve 452, to fill the piston side of the cylinders 422 and 424. If the load on the platform 412 does not reach the load threshold, the platform 412 will stall, necessitating lowering using the pump 434, as described above.

Once the platform 412 is fully lowered (such as at ground level) the raise valve 452, the lock valves 456 and 458, and the energy valve 462, are all de-energized. This locks the positions of the cylinders 422 and 424, and maintains the compressed air (gas) in the accumulator 440. In this state the load can be removed from the platform 412.

The platform 412 can then be raised using (at least in part) the stored energy in the accumulator 440. The raise valve 452, the lock valves 456 and 458, and the energy valve 462, are again energized. This allows oil to flow from the accumulator 440, driven by the stored compressed gas. The oil flows into the rod sides of the cylinders 422 and 424, raising the platform 412, such as back to bed height position. The ascent speed may be controlled by the speed control 466. Oil from the piston sides of the cylinders 422 and 424 returns to the pump reservoir 444 through the energized raise valve 452.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A liftgate assembly comprising:
   a liftgate that is movable from a raised position to a lowered position; and a hydraulic power unit usable to raise the liftgate from the lowered position;

wherein the hydraulic power unit includes an energy-recovery mechanism configured to store energy while the liftgate is being lowered under load, and to use the energy stored by the energy-recovery mechanism subsequently to raise the liftgate;

wherein the hydraulic power unit includes a pump that pumps hydraulic fluid from a reservoir;

wherein the energy-recovery mechanism includes an accumulator that is configured to receive hydraulic fluid while the liftgate is being lowered under load, to store the energy;

wherein a selector for lowering with energy recovery engages the energy recovery mechanism;

wherein the selector engages the energy recovery mechanism only when a load on the liftgate exceeds a threshold load; and wherein the selector includes a pressure sensor incorporated on the liftgate.

2. The liftgate assembly of claim 1, wherein the accumulator is a hydraulic accumulator.

3. The liftgate assembly of claim 1, wherein the accumulator includes a gas that is compressed by flow of pressurized hydraulic fluid into the accumulator.

4. The liftgate assembly of claim 3, wherein the gas is or includes nitrogen.

5. The liftgate assembly of claim 1, wherein the energy-recovery mechanism further includes a gas pressure sensor that measures pressure of the gas of the accumulator.

6. The liftgate assembly of claim 1, wherein the energy-recovery mechanism includes an accumulator lock valve that controls flow of the hydraulic fluid to and from the accumulator.

7. The liftgate assembly of claim 1, wherein the energy-recovery mechanism includes an accumulator relief valve that prevents overpressurizing of the accumulator by opening to allow flow of the hydraulic fluid to the reservoir when a predetermined pressure in the accumulator is exceeded.

8. The liftgate assembly of claim 1, wherein the hydraulic power unit further includes an oil pressure sensor in a high pressure line.

9. The liftgate assembly of claim 8,
wherein the hydraulic power unit further includes a ram lock valve in the high pressure line, for selectively retaining high pressure in one side of a hydraulic cylinder/ram of the hydraulic power unit; and
wherein the oil pressure sensor senses pressure between the ram lock valve and the hydraulic cylinder/ram.

10. The liftgate assembly of claim 9, wherein a piston rod is attached to a ram head of the hydraulic cylinder/ram.

11. The liftgate assembly of claim 10, wherein the ram head is operatively coupled to a mechanical mechanism for raising and lowering the liftgate.

12. The liftgate assembly of claim 8, wherein the accumulator is fluidly coupled to the high pressure line.

13. The liftgate assembly of claim 1, wherein the selector for lowering with energy recovery is also used to raise the liftgate using energy stored by the energy-recovery mechanism.

14. The liftgate assembly of claim 1,
further comprising a controller that outputs signals to at least some controllable components of the hydraulic power unit;
wherein inputs for the controller include selections from an operator control unit.

15. The liftgate assembly of claim 1,
further comprising a controller that outputs signals to at least some controllable components of the hydraulic power unit;
wherein inputs for the controller include gas pressure in the accumulator.

16. The liftgate assembly of claim 1, wherein the energy-recovery mechanism converts potential energy of lowering the liftgate to compressed gas energy as the liftgate is lowered from the raised portion to the lowered position.

17. The liftgate assembly of claim 1, wherein engagement of the energy recovery system is controlled automatically by a controller.

18. A method of unloading a product from a vehicle using a liftgate, the method comprising:
storing energy in a hydraulic accumulator while the liftgate is being lowered under load, with the product on the liftgate;
after the being lowered, removing the product from the liftgate; and
after the removing, using the energy from the hydraulic accumulator to raise the liftgate;
wherein the liftgate is part of a liftgate assembly that includes:
a hydraulic power unit usable to raise the liftgate from the lowered position;
wherein the hydraulic power unit includes the hydraulic accumulator;
wherein the hydraulic power unit includes a pump that pumps hydraulic fluid from a reservoir;
wherein a selector for lowering with energy recovery engages the hydraulic power unit;
wherein the selector engages the hydraulic power unit only when a load on the liftgate exceeds a threshold load; and
wherein the selector includes a pressure sensor on the liftgate.

* * * * *